United States Patent
Travis et al.

(10) Patent No.: US 7,794,818 B2
(45) Date of Patent: Sep. 14, 2010

(54) SHAPED INTERLAYER FOR HEADS-UP DISPLAY WINDSHIELDS AND PROCESS FOR PREPARING SAME

(75) Inventors: Jimmy K. Travis, Fayetteville, NC (US); Randall A. Hollingsworth, Fayetteville, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 811 days.

(21) Appl. No.: 11/789,843

(22) Filed: Apr. 25, 2007

(65) Prior Publication Data

US 2007/0269639 A1  Nov. 22, 2007

Related U.S. Application Data

(62) Division of application No. 10/478,623, filed as application No. PCT/US02/21111 on Jun. 17, 2002, now Pat. No. 7,521,110.

(60) Provisional application No. 60/298,802, filed on Jun. 15, 2001.

(51) Int. Cl.
| | |
|---|---|
| B32B 3/00 | (2006.01) |
| B32B 23/02 | (2006.01) |
| B32B 17/10 | (2006.01) |
| B32B 27/42 | (2006.01) |
| G09G 5/00 | (2006.01) |
| G02B 27/14 | (2006.01) |
| B60J 1/00 | (2006.01) |
| B29C 47/00 | (2006.01) |
| B29C 47/12 | (2006.01) |

(52) U.S. Cl. .......... 428/156; 428/192; 428/215; 428/212; 428/437; 359/630; 296/84.1; 345/7; 156/244.25; 264/177.1

(58) Field of Classification Search .......... 428/156, 428/172, 192, 215, 212, 437, 220; 359/630; 296/84.1; 345/7; 156/244.25; 264/177.1
See application file for complete search history.

(56) References Cited

U.S. PATENT DOCUMENTS

| 5,639,538 A | 6/1997 | Wong |
| 5,812,332 A | 9/1998 | Freeman |
| 6,838,142 B2 | 1/2005 | Yang et al. |
| 2004/0053006 A1 | 3/2004 | Omizu et al. |

FOREIGN PATENT DOCUMENTS

WO  WO 99/46213  9/1999

*Primary Examiner*—David R Sample
*Assistant Examiner*—Catherine Simone
(74) *Attorney, Agent, or Firm*—Kevin S. Dobson; Mark D. Kuller

(57) ABSTRACT

A self-supporting adhesive web 10 having a uniform thickness profile across at least 20% of its width as shown by areas A and B and a wedge-shaped thickness profile in areas C and D. As shown in FIG. 2, a laminate comprises sheets of glass 12 and 14 having sandwiched therebetween adhesive interlayer 16. Interlayer 16 has a uniform thickness profile extending from edge 18 to point 20 and a wedge-shaped thickness profile from point 20 to edge 22.

23 Claims, 4 Drawing Sheets

SHAPED INTERLAYER FOR HEADS-UP DISPLAY WINDSHIELDS AND PROCESS FOR PREPARING SAME

This application is a divisional of U.S. patent application Ser. No. 10/478,623, filed Nov. 17, 2003, now U.S. Pat. No. 7,521,110, which is incorporated herein by reference, which is a 371 of PCT/US02/21111, filed Jun. 17, 2002, which claims the benefit of U.S. Provisional Patent Application No. 60/298,802, filed Jun. 15, 2001.

BACKGROUND OF THE INVENTION

Heads-up instrument displays (HUD) for vehicles have been used to provide virtual images that appear to be located ahead of the vehicle windshield toward the front of the vehicle. These displays provide the advantage of increased safety since the operator does not have to divert attention significantly from viewing the outside to check instruments.

Most conventional windshields are made by placing a layer of adhesive, e.g. polyvinyl butyral (PVB) or polyurethane, which has a substantially uniform thickness between two sheets of glass and laminating the sandwiched assembly in an autoclave. In a conventional HUD, where the image source is located away from the windshield, the light from the image source reflects off the windshield toward the viewer who sees the image floating in space beyond the windshield. If a conventional windshield is used, the viewer sees two separated images, one from the inside surface of the windshield and one from the outside surface. When these two images do not align in the viewer's sight, a ghost image is seen which interferes with acceptable viewing.

Approaches to reduce the ghost image problem include use of an adhesive interlayer disposed within the windshield with the interlayer having a predetermined wedge angle. The wedge angle is selected pursuant to the anticipated installation angle of the windshield, thickness of the glass sheets, and angle of incidence of the projected image so as to substantially superimpose the images generated from a dashboard display device that is reflected from the inside surface and outside surface of the windshield into a substantially singular image in the eyes of the vehicle operator. Among the approaches are those disclosed in U.S. Pat. No. 5,013,134 and Published PCT Application WO 91/06031 and U.S. Pat. No. 5,639,538.

The wedge angle for HUD projection devices is established by using an adhesive sheet having a wedge-shaped thickness profile extending continuously across the width from edge to edge of the sheet. Such a sheet and a process for preparing the sheet are disclosed in U.S. Pat. No. 5,087,502.

Web handling problems are encountered in manufacturing and transporting webs having a wedge-shaped thickness profile extending continuously across the width of the sheet. Web walking is the term used to describe sheeting that moves uncontrollably in the transverse direction as it is conveyed or processed. Telescoping is a term that describes what occurs when the core or individual layers of a rolled web becomes offset, or unevenly rolled. Web walking and telescoping damage the web and render it difficult or impossible to use in preparing windshields. These problems also limit tinting of the web. While special web handling equipment and procedures can be used with varying degrees of success, this is expensive and usually requires duplicating existing equipment used in preparing conventional adhesive sheeting. Making only short rolls may alleviate these problems. However, short rolls necessitate frequent changing of rolls during production and by the customer who processes the sheeting into windshields. In addition, shapes provided by prior art process often require additional trimming of the web, as extruded, resulting in an economic loss due to scrap created by trimming. Also, some of the prior art process requires a wider extrusion line due to the additional trimming.

It would therefore be advantageous to provide adhesive sheeting suitable for HUD windshield manufacture that does not require special web handling equipment and procedures or the creating of scrap that must be disposed of or recycled. Changing the shape of the web as extruded permits production on a more narrow extrusion line thus assuring supply to the market and increasing the flexibility of existing manufacturing facilities.

Shapes which minimize overall thickness while maintaining overall functional utility provide further economic advantage in material savings. Asymmetrical shapes provide capability to produce wider widths on narrow lines. Asymmetrical shapes can also be utilized to produce multiple wedge shapes simultaneously thus providing additional economic advantage by minimizing the frequency of long transition times to multiple shapes required for specific applications.

SUMMARY OF THE INVENTION

In one aspect, the present invention is a continuous web (10) of self-supporting adhesive sheet useful for making a transparent adhesive interlayer (16) comprising: (a) an area of uniform thickness profile (AB) across at least 20% of its width starting at the center of the web and continuing in both directions toward the outer edges of the web, and (b) two areas of variable thickness profile increasing in thickness from the outer edges of the web to the area of uniform thickness at the center of the web, such that by splitting the web in the region of uniform thickness (AB), two pieces of sheet are obtained each having an area of at least 20% uniform thickness. The two areas of variable thickness profile may increase at equal or unequal rates depending on the specific manufacturing and/or end use requirements.

In another aspect, the present invention is a continuous web of self-supporting adhesive sheet useful for making a transparent adhesive interlayer comprising (a) two areas of uniform thickness profile across at least 20% of its width extending from the edges of the web toward the center such that by splitting the web near its midpoint between the outer edges, two pieces of sheet are obtained each having an area of at least 20% uniform thickness and (b) an area of variable thickness profile increasing in thickness starting from the center of the web and increasing linearly at equal or different slope values in the direction of both edges to the areas of uniform thickness along the edges of the web, wherein a vertex is formed at each juncture where an area of uniform thickness meets an area of variable thickness, and the vertices maybe curved such that a sharp edge is not detectable by physical inspection of the curved vertex.

In another aspect, the present invention is a continuous web of self-supporting adhesive sheet useful for making a transparent adhesive interlayer comprising (a) two areas of uniform thickness profile across at least 20% of its width extending from the edges of the web toward the center such that by splitting the web in the non-uniform thickness region, two pieces of sheet are obtained each having an area of at least 20% uniform thickness and (b) an area of variable thickness profile increasing in thickness in a continuous and non-linear manner, starting from the center of the web and increasing in the direction of both edges to the areas of uniform thickness, wherein a vertex is formed at each juncture where an area of uniform thickness meets an area of variable thickness, and the vertices can be curved such that a sharp edge is not detectable by physical inspection of the curved vertex.

DETAILED DESCRIPTION OF THE INVENTION

The web sheets of the present invention are finished width vinyl material having a length suitable for use in windshields, or any length up to and including lengths suitable for finished supply rolls. In the present invention, "wedge areas" are areas where the thickness of the web sheet is changing—that is, not constant—or non-uniform. For the purposes of the present application, wedge areas can also be referred to herein as areas of non-uniform or variable thickness. In any of the webs described in the present application, the area of variable thickness profile can increase symmetrically or asymmetrically relative to the web centerline, depending on the specific manufacturing and/or end use requirements. Web thickness profiles as described herein refer to the thickness of a cross-section of the web.

Figure 1:
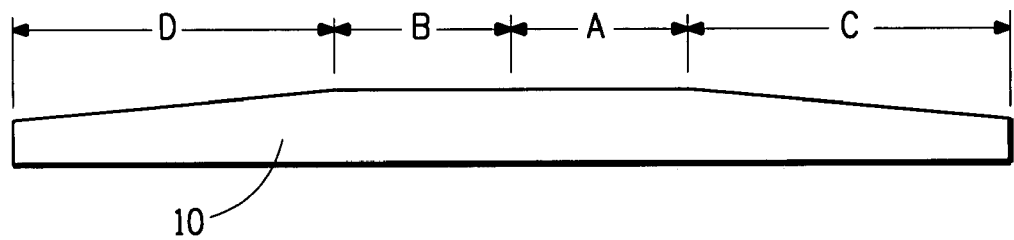
FIG. 1 is a schematic sectional view of a full width self-supporting adhesive web showing its thickness profile.
Figure 2:
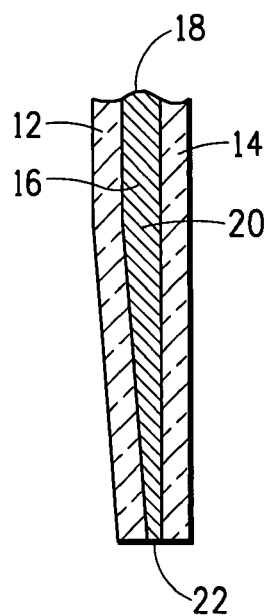
FIG. 2 is a schematic partial sectional view of a transparent laminate showing the sheet thickness profile of one-half of the adhesive web of FIG. 1 which has been incorporated in the laminate.
Figure 3:
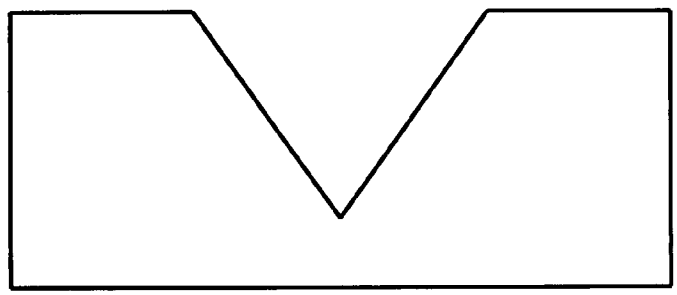
FIG. 3 is a schematic sectional view of a full width self-supporting adhesive web showing its thickness profile, wherein the outer portions of the web are areas of uniform thickness, and the middle section of the web tapers to an area of minimum thickness.
Figure 4:
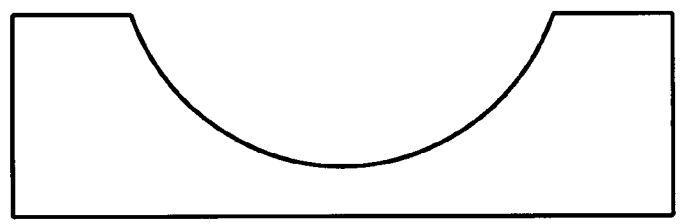
FIG. 4 is a schematic sectional view of a full width self-supporting adhesive web showing its thickness profile, wherein the outer portions of the web are areas of uniform thickness, and the middle section of the web tapers to an area of minimum thickness, the area of minimum thickness has a rounded or smoothed thickness profile.
Figure 5:
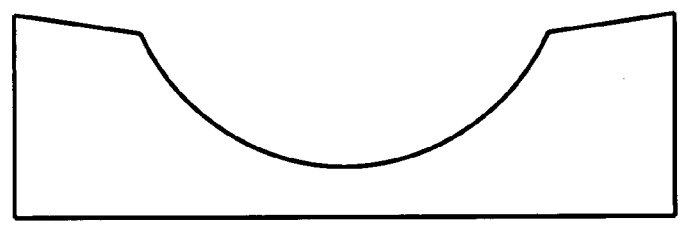
FIG. 5 is a schematic sectional view of a full width self-supporting adhesive web showing its thickness profile, wherein the outer portions of the web are tapered areas of decreasing thickness, and the middle section of the web tapers to an area of minimum thickness, the area of minimum thickness having a rounded or smoothed thickness profile.
Figure 6:
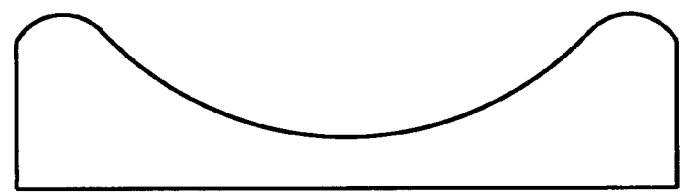
FIG. 6 is a schematic sectional view of a full width self-supporting adhesive web showing its thickness profile, wherein the outer portions of the web are areas of uniform thickness have a rounded or smoothed thickness profile at the transition to the area of decreasing thickness profile in the middle section of the web, and the middle section of the web tapers to an area of minimum thickness having a rounded or smoothed thickness profile.

Referring now to the drawings, there is shown in FIG. 1, a self-supporting adhesive web 10 having a uniform thickness profile across at least 20% of its width as shown by areas A and B and a wedge-shaped thickness profile in areas C and D. As shown in FIG. 2, a laminate comprises sheets of glass 12 and 14 having sandwiched therebetween adhesive interlayer 16. Interlayer 16 has a uniform thickness profile extending from edge 18 to point 20 and a wedge-shaped thickness profile from point 20 to edge 22. The interlayer is made by slitting web 10 of FIG. 1 at or near its center-line in the transverse direction, cutting the slit web into sheets and incorporating the sheets in a windshield, windscreen, window, viewpoint, or any other transparent laminate through which a surrounding environment may be viewed which may include the windshield of an automobile or other overland vehicle, or the windscreen of an aircraft, etc. The web from the wound rolls can be stretched by known processes such as disclosed in U.S. Pat. No. 5,087,502. Surprisingly, no special web handling equipment or procedures are required in winding the web into large rolls, and there is virtually no perceptible visual imparity in the windshield along the line where the thickness profile transitions from uniform to wedge. The laminate may be composed of glass, plastic such as polycarbonate or acrylic or other transparent material.

In one embodiment, a "single-cut" wedge can be obtained directly from production lines, wherein the single cut wedge has the same shape as a wedge obtained after slitting a wedge of the present invention at or near its midpoint. A single cut wedge can be obtained without the necessity of slitting the double wedge by running the web on single cut production line.

The adhesive web of this invention is useful as an interlayer in manufacturing windshields providing a HUD. The interlayer is disposed within the windshield with the wedge extending transversely thereof and tapering inwardly from the upper toward the lower regions of a head-up display viewing area which includes an image area.

Referring to FIG. 2, the image area will lie in the region of the windshield between point 20 and edge 22. The geometry of interlayer 16 from point 20 to edge 22 is defined as wedge-shaped, that is the distance between the inner surfaces of glass sheets 12 and 14 decreases when measured at various points from point 20 to edge 22. This wedge shape is expressed in terms of the wedge angle created by intersecting planes parallel to the first and second surfaces of interlayer 16. The wedge angle is very small. Generally wedge angles from 0.1 to 1.0 milliradian will be used.

The interlayer wedge angle is selected pursuant to the anticipated installation angle of the windshield, thickness of the transparent sheet material, and angle of incidence of the projected image so as to substantially superimpose the reflected images generated from a dashboard display device and reflected from the inboard surface and from the outboard surface of the outboard sheet into a substantially singular image in the eyes of the vehicle operator.

The wedge portion can increase in thickness in a linear fashion or in a continuous but non-linear fashion. By "continuous but non-linear", it is meant that while the overall thickness of the wedge portion of the interlayer will constantly increase without decreasing (continuous increase) the rate of increase may not be linear, or the increase may be linear and then non-linear, or there may be regions where the increase is linear and other regions where the increase is non-linear. Regions of non-linear increase can include regions where the slope is increasing according to the equation of a curved line, or where the slope of the plane varies along the surface of the web, or a combination of patterns whereby the increased thickness cannot be predicted according to the equation of a straight line. In the present application, the above discussion applies whether the thickness of the web is said to be increasing or decreasing, noting that whether the thickness is said to "increase" or "decrease" will depend upon whether the thickness of the web increases or decreases relative to the thickness of the starting reference point.

The width, thickness of the area of uniform thickness, and the thickness profile of the wedge areas can be controlled using known equipment for extruding plastic material. This can be done by either manually or automatically adjusting the lips of a flat sheet extrusion die. The areas of uniform thickness can have a thickness from 380 to 2286 micrometers with the wedged areas tapering to provide the desired wedge angle. In the present application, it is to be understood that there can be normal variation from the die lip set point in an extrusion process, and the resulting normal variation in web thickness does not render the web thickness "non-uniform". For example, a sheet of the present invention can be set to be extruded to have a uniform thickness of 400 micrometers. However, the thickness at any given point in the area of uniform thickness may vary unintentionally. It is not known with numeric specificity what normal variation might be in a given extrusion process, but unless the intent of the operator is to change the thickness of the sheet during the extrusion process, any variation of the thickness is herein defined as "normal variation". The wedged area must have a width sufficient to accommodate the image area, but otherwise, the size of the area is not critical provided that the area of uniform thickness of the web is at least 20% of the total area of the web.

The preferred material for the interlayer of this invention is plasticized polyvinyl butyral which may be prepared by methods known to those skilled in the art, as is described, for example, in U.S. Pat. Nos. 2,720,501, 2,400,957 and 2,739,957. Such plasticized polyvinyl butyral material is available commercially from, for example, E. I. du Pont de Nemours and Company under the trademark Butacite®. Other useful materials include plasticized polyvinyl chloride, polyesters and polyurethanes.

The plasticized polyvinyl butyral structures of this invention are preferably melt-extruded in a manner such as is described in U.S. Pat. No. 2,829,399. Preferably, the extruded film is quenched in a water bath and dimensionally stabilized in a manner such as that described in U.S. Pat. No. 3,068,525, for example. The film can be printed with a gradated tinted band as described in either U.S. Pat. Nos. 2,957,766 or 3,591,406. The film is preferably extruded in widths up to 3.50 meters, slit at or near the center and wound up as two rolls. Each roll is then tinted off-line to effect a gradated band along the longitudinal edge having uniform thickness. No web handling problems are encountered provided at least 20% of the web area has a uniform thickness profile.

Figure 7A:
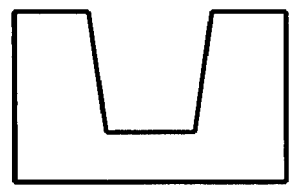
FIG. 7a is a schematic sectional view of a full width self-supporting adhesive web showing its thickness profile, wherein the outer portions of the web are areas of uniform thickness that taper to an area of uniform minimum thickness in the middle section of the web.
Figure 7B:
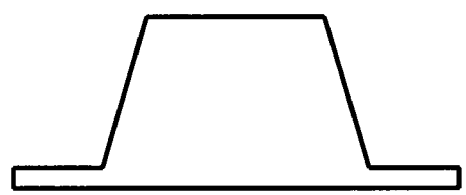
FIG. 7b is a schematic sectional view of a full width self-supporting adhesive web showing its thickness profile, wherein the outer portions of the web are areas of uniform minimum thickness that taper to an area of maximum thickness in middle section of the web.
Figure 8:
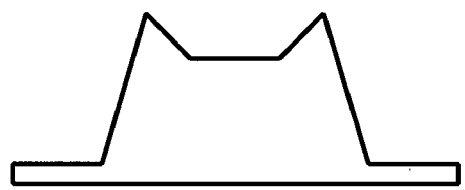
FIG. 8 is a schematic sectional view of a full width self-supporting adhesive web showing its thickness profile, wherein the outer portions of the web are areas of uniform thickness, the web increasing in thickness towards the middle of the web, then decreasing in thickness towards the middle section of the web, the middle section having a uniform thickness greater than the thickness of the outer areas of uniform thickness.

The wedge profiles described by FIGS. 7a and 7b can have rounded or smoothed vertices. Rounding or smoothing of the vertices can be beneficial for the manufacturing process and also impart functional benefits to a windshield.

EXAMPLES

Example 1

PVB (polyvinyl butyral) molten polymer is extruded through a slot type flat sheet extrusion die to make sheeting for use in the Heads Up Display (HUD) systems. This slot type flat sheet extrusion die will have two die lips that are essentially parallel until the slot width is adjusted to produce sheeting for use in HUD systems. One or both of the lips are adjustable to alter the width between the opposing lips of the die slot.

The transverse sheeting thickness is adjusted and controlled by adjusting the slot width of the die to develop the desired thickness profile at the end of the extrusion line where the sheeting is wound into rolls. A finished sheeting thickness target is entered into an automatic transverse direction thickness control system that has programming to adjust the slot width of the flat sheet extrusion die. By establishing the desired finished sheeting thickness target for specific HUD sheeting thickness profiles, various thickness profiles are produced to meet individual application requirements and HUD system needs.

Example 2

Figure 9:
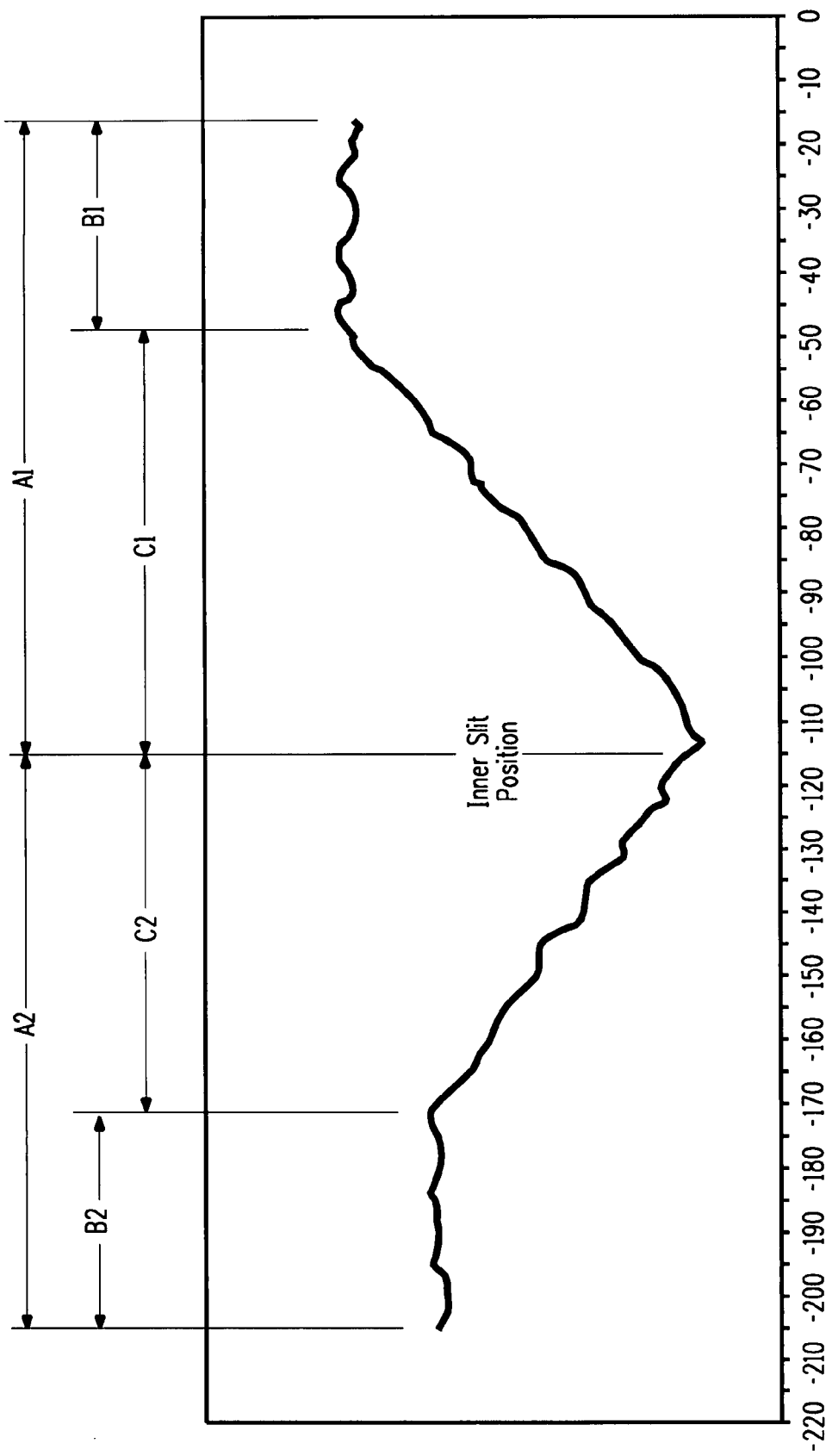
FIG. 9 shows the thickness profile of the PVB web described in Example 2, which has dimensions and wedge angles further defined in Table 1.

Using the process described in Example 1 a PVB web was produced with a thickness profile as depicted in FIG. 9 with dimensions and wedge angles further defined in Table 1. This web was slit at the inner slit position and wound to form two separate rolls. The separate rolls were asymmetric about the inner slit position and distinct with respect to overall, A1 and A2 width and average thickness, flat region B1 and B2 width and average thickness, wedge region, C1 and C2 width, average thickness and wedge angle.

TABLE 1

|    | Width (inches/cm) | Avg Thickness (mils/mm) | Wedge Angle (miliradians) |
|----|-------------------|-------------------------|---------------------------|
| A1 | 49.5/126          | 37.9/963                |                           |
| A2 | 44.5/113          | 36.2/919                |                           |
| B1 | 17/43             | 41.2/1046               |                           |
| B2 | 16/41             | 39.0/991                |                           |
| C1 | 32.5/83           | 36.2/919                | 0.29                      |
| C2 | 28.5/72           | 35.8/909                | 0.24                      |

What is claimed is:

1. A process for preparing transparent adhesive polyvinyl butyral interlayer, the process comprising:
   a. providing a continuous web of self-supporting adhesive polyvinyl butyral sheet;
   b. slitting the web at or near its mid-point to form two slit webs; and
   c. winding the slit webs onto separate rolls;
   wherein the continuous web of self-supporting adhesive polyvinyl butyral sheet comprises:
   (i) two areas of uniform thickness profile across at least 20% of its width extending from the edges of the web toward the center such that by splitting the web at or near its midpoint between the outer edges, two pieces of sheet can be obtained each having an area of at least 20% uniform thickness, and (ii) an area of non-uniform thickness profile wherein the thickness of the web is continuously increasing starting at or near the center of the web and increasing in the direction of both edges to the areas of uniform thickness along the edges of the web, wherein a vertex is formed at each juncture where an area of uniform thickness meets an area of non-uniform thickness, and wherein the vertices are curved such that a sharp edge is not detectable by physical inspection of the vertex.

2. The process of claim 1 wherein said non-uniform thickness profile has a wedge angle from 0.1 to 1.0 milliradians.

3. The process of claim 1 wherein said non uniform thickness is from 380 to 2286 micrometers.

4. The process of claim 2 wherein said uniform thickness is from 380 to 2286 micrometers.

5. The process of claim 1 wherein the area of non-uniform thickness profile continuously increases linearly in the direction of both edges to the areas of uniform thickness along the edges of the web.

6. The process of claim 1 wherein the thickness of the web increases from the center of the web towards the edges at different rates such that an asymmetric web thickness profile is obtained.

7. The process of claim 5 wherein said non-uniform thickness profile has a wedge angle from 0.1 to 1.0 milliradians.

8. The process of claim 5 wherein said uniform thickness is from 380 to 2286 micrometers.

9. The process of claim 7 wherein said uniform thickness is from 380 to 2286 micrometers.

10. The process of claim 1 wherein the area of non-uniform thickness profile continuously increases in a non-linear manner starting at or near the center of the web and increasing in the direction of both edges to the areas of uniform thickness.

11. The process of claim 10 wherein said non-uniform thickness profile has a wedge angle from 0.1 to 1.0 milliradians.

12. The process of claim 10 wherein said uniform thickness is from 380 to 2286 micrometers.

13. The process of claim 11 wherein said uniform thickness is from 380 to 2286 micrometers.

14. The process of claim 1 wherein the slit webs comprise (a) an area of uniform thickness profile across at least 20% of its width extending from one edge of the web toward the center, and (b) an area of non-uniform thickness profile increasing in thickness starting from the opposite edge of the web and increasing in the direction of the area of uniform thickness, wherein a vertex is formed at each juncture where an area of uniform thickness meets an area of non-uniform thickness, and wherein the vertices are curved such that a sharp edge is not detectable by physical inspection of the vertex.

15. The process of claim 14 wherein the non-uniform thickness profile of each slit web has a wedge angle from 0.1 to 1.0 milliradians, and wherein the uniform thickness of each slit web is from 380 to 2286 micrometers.

16. A process for preparing transparent adhesive polyvinyl butyral interlayer, the process comprising:
 a. providing a continuous web of self-supporting adhesive polyvinyl butyral sheet;
 b. slitting said web at or near its mid-point to form two slit webs; and
 c. winding the slit webs onto separate rolls;
wherein the continuous web of self-supporting adhesive polyvinyl butyral sheet useful for making a transparent adhesive interlayer comprises: (a) an area of uniform thickness profile across at least 20% of its width starting at the center of the web and continuing in both directions toward the outer edges of the web, and (b) two areas of variable thickness profile increasing in thickness from the outer edges of the web to the area of uniform thickness at the center of the web, such that by splitting the web in the region of uniform thickness, two pieces of sheet can be obtained each having an area of at least 20% uniform thickness.

17. The process of claim 16 wherein the variable thickness profile has a wedge angle from 0.1 to 1.0 milliradian.

18. The process of claim 16 wherein said uniform thickness is from 380 to 2286 micrometers.

19. The process of claim 16 wherein the variable thickness profile has a wedge angle from 0.1 to 1.0 milliradians, and the uniform thickness is from 380 to 2286 micrometers.

20. A process for preparing transparent adhesive polyvinyl butyral interlayer, the process comprising:
 a. providing a continuous web of self-supporting adhesive polyvinyl butyral sheet;
 b. slitting said web at or near its mid-point to form two slit webs; and
 c. winding the slit webs onto separate rolls,
wherein the continuous web of self-supporting adhesive polyvinyl butyral sheet comprises: (a) an area of uniform thickness profile across at least 20% of its width starting the center of the web and continuing in both directions toward the outer edges of the web, (b) two areas of minimum thickness along the outer portions of the web, and (c) two areas of variable thickness profile increasing in thickness from the two areas of minimum thickness to the area of uniform thickness at the center of the web, such that by splitting the web in the region of uniform thickness, two pieces of sheet can be obtained each having an area of at least 20% uniform thickness.

21. The process of claim 20 wherein the variable thickness profile has a wedge angle from 0.1 to 1.0 milliradian.

22. The process of claim 20 wherein said uniform thickness is from 380 to 2286 micrometers.

23. The process of claim 20 wherein the variable thickness profile has a wedge angle from 0.1 to 1.0 milliradians, and the uniform thickness is from 380 to 2286 micrometers.

\* \* \* \* \*